Figure 1:
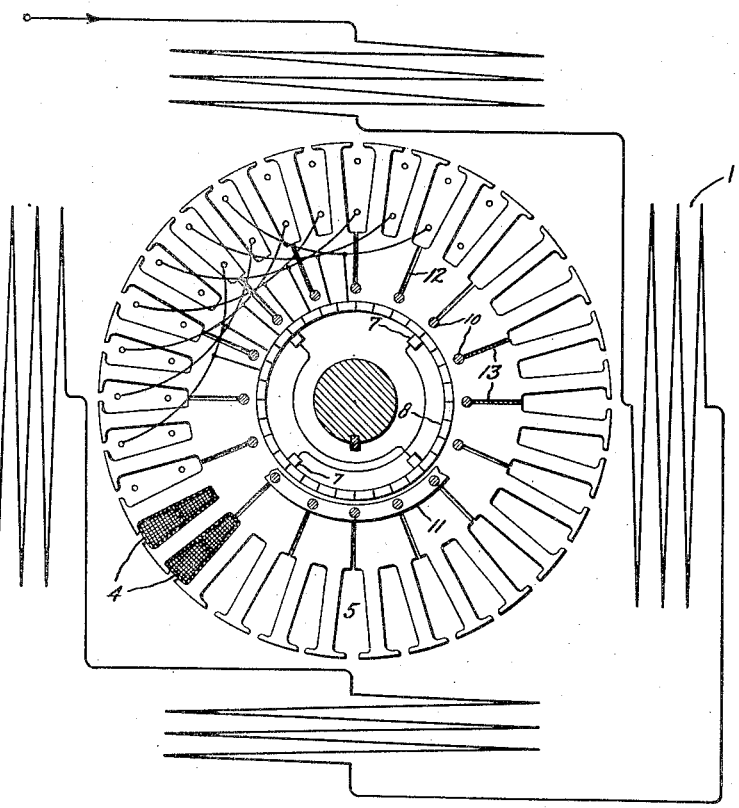

March 19, 1929.  S. R. BERGMAN  1,706,137
ALTERNATING CURRENT COMMUTATOR MOTOR
Filed Dec. 22, 1927

Inventor:
Sven R. Bergman,
by
His Attorney.

Patented Mar. 19, 1929.

1,706,137

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

ALTERNATING-CURRENT COMMUTATOR MOTOR.

Application filed December 22, 1927. Serial No. 241,969.

My invention relates to alternating current dynamo electric machines, and more particularly to the induced members of alternating current motors having a squirrel cage winding and a commutated winding.

In my United States Patent No. 1,537,737, May 12, 1925, I have described a motor of this type in which a squirrel cage winding is provided in slots beneath the commutated winding, the two windings being separated by a flux path of sufficient depth to carry the normal starting flux of the motor without excessive saturation for the purpose of obtaining the desirable starting characteristics developed by the commutated winding. The flux path was also designed to have sufficient reluctance that during normal operation enough of the motor flux cuts the squirrel cage winding to obtain the desirable substantially constant speed running characteristics produced by the squirrel cage winding. The reluctance of the flux path between the two rotor windings was preferably obtained by providing a narrow air gap in this flux path between the two windings.

In the particular motor described in this patent the same number of slots were provided for both the commutated winding and the squirrel cage winding and non-magnetic eddy current conductors were preferably placed in the narrow slots between the windings for the purpose of improving commutation.

When it becomes desirable to build such motors in small sizes, for example, below about one-half horse power, the rotor diameter becomes so small that primarily for mechanical reasons it becomes desirable to make the number of squirrel cage slots less than the number of slots provided for the commutated winding. For example, the diameter of the squirrel cage for a well designed one-half horse power motor of this type is only about two inches and the slots in the laminations provided for this winding come close together and fairly close to the motor shaft opening. The dimensions of the air gap between the two windings are reduced in like proportion. It is impractical to stamp the laminations for these small air gaps and with the slot openings very close together and where only a small amount of material remains between the squirrel cage slots the rotor is weak mechanically.

The present invention relates to a motor having the characteristics of the motor of my above mentioned patent in which the number of squirrel cage bar slots is reduced preferably to one-half of the number of the commutated winding slots. In order to do this and still obtain an electrically balanced rotor and the beneficial effects of the squirrel cage winding and the eddy current conductors on the commutation of the motor, it becomes necessary to arrange the commutated winding so that all circuits which are to be commutated are equally inductively associated with a squirrel cage bar and and the eddy current conductor located in the narrow slot between the two rotor windings, if eddy current conductors are provided. I preferably accomplish this result by placing the commutated coils in their slots so that one side is above a squirrel cage bar and the corresponding eddy current conductor and the other side comes above a solid portion of the laminated rotor iron. The motor is otherwise proportioned in accordance with the teaching of my Patent No. 1,537,737 to obtain the desirable characteristics with the new relation of the number of slots in the two rotor windings.

The features of my invention which are believed to be new and patentable will be pointed out in the claims appended hereto. For a better understanding of my invention reference is made in the following description to the accompanying drawing in which Fig. 1 represents an explanatory diagram of a motor designed in accordance with my invention where the squirrel cage is of copper, and Fig. 2 illustrates a rotor lamination intended to accommodate a cast aluminum squirrel cage.

Figure 2:
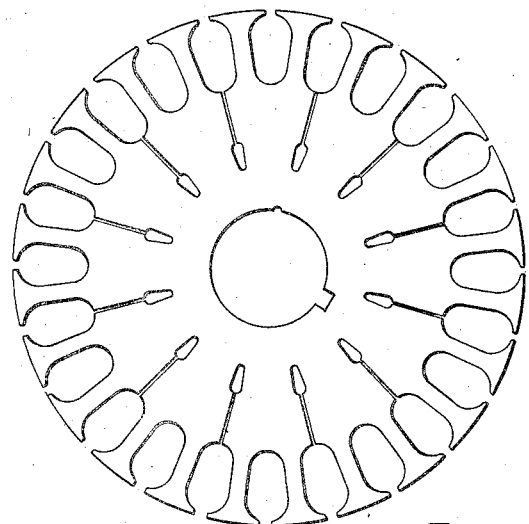

Referring to Fig. 1, 1 represents a single phase, four-pole stator winding. Ordinarily this will be a distributed winding. It might be polyphase but usually motors of the small size contemplated will be single phase and are intended to be connected directly to the line without any intermediate starting step.

The commutated winding 4 here represented comprises a plain repulsion motor winding having lap wound coils one end of which is in the top and the other end in the bottom of peripheral slots 5. At the lower left side of Fig. 1 the arrangement of the coils in the slots is represented and at the upper left side of Fig. 1 the end connections at the commutator end of the machine are represented. Each coil is connected to a bar of the commutator 8 and the commutator is short-circuited through brushes 7 along axes to produce desirable repulsion motor action. The rotor is provided with a squirrel cage winding comprising bars 10 and end rings 11. The squirrel cage is proportioned in Fig. 1 to be made of copper. The considerable distance between the commutated winding 4 and the squirrel cage winding 10 is to provide a flux path between these windings of sufficient capacity to carry the normal motor flux without excessive saturation under starting conditions at which time the flux will usually be a maximum. As explained in my Patent No. 1,537,737 this assures that the desirable starting characteristics of the repulsion motor will be retained.

Between the two windings are provided air gaps or slits 12 which make the reluctance of the flux path between the windings sufficient to cause a desirable portion of the rotor flux to thread the squirrel cage winding whereby the desirable constant speed characteristics of the squirrel cage are retained under normal running conditions. The arrangement differs from that of my former patent in that there are only half as many squirrel cage bars 10 and slits 12 as there are winding slots in the commutated winding and the reason for this is the difficulty of punching the laminations to provide for a larger number of squirrel cage bars and corresponding air gaps at the small diameter contemplated. We could of course reduce the commutated winding slots in like proportion but we would lose by this because then the periphery of the rotor would not be utilized efficiently and we would have to increase the size of the rotor to get the same capacity. A more fundamental reason why a reduction of the number of slots in the commutated winding would be detrimental lies in the fact that such a reduction would increase the reactance of the commutated winding. Not only would the starting conditions be impaired but also the running conditions, and for the following reasons:—

In starting we have two windings in multiple, namely the commutated winding and the squirrel cage. The principal idea of this type of motor is, in starting to force as much current as possible through the commutated winding and as little as possible in the squirrel cage. Since the two circuits are in multiple we must attempt to design the commutated winding with as low impedance as possible, otherwise the division of the current will be unfavorable.

Under the running conditions, the commutated winding contributes largely to the output; for example, at full load the commutated winding carries about one-half the output and at overload, more than one-half the output. Also, here high reactance of the commutated winding would be detrimental since high reactance means loss of output.

For these reasons, it is important that the commutated winding be distributed in as many slots as practicable. Heretofore, it was necessary to use comparatively few slots in small diameters of the rotor due to the fact that with the same number of bars in the squirrel cage, the number of slots was determined by the mechanical requirements of the squirrel cage. Now that we are adopting, in small diameters, a lesser number of slots in the squirrel cage, as compared with the commutated winding, we can choose our number of slots in the commutated winding to give the best electrical conditions, which means a comparatively large number of slots in the commutated winding.

In the narrow slits 12 there may be placed nonmagnetic eddy current conductors one of which is represented at 13. These conductors when used are preferably made of phosphor bronze and are of the correct size to fit snugly in the narrow slits 12. The purpose of these conductors is to improve commutation as explained in my previous patent. These conductors, being inductively associated with the commutated winding, dissipate to a large extent the energy that would otherwise be expended at the brushes in sparking. That is to say, the high frequency flux due to the frequency of commutation produces eddy currents in these conductors without otherwise disturbing the characteristics of the machine. The squirrel cage produces the same result but is not quite so effective.

There are twice as many coils and commutator bars as there are squirrel cage bars and conductors 13 so that a special arrangement of the commutated winding becomes desirable so that all coils or circuits of this winding are equally inductively linked with an eddy current conductor and to a less extent with a squirrel cage bar. One way of doing this is represented in Fig. 1 where it will be seen that the coil pitch is an uneven number of slots such that one end of a coil is in a slot directly over a squirrel cage bar and the corresponding eddy current conductor while the other end is over a solid part of the rotor. This system is carried out with all the coils so that all coils are in close inductive relation with an eddy current conductor at one side. The beneficial results produced by the eddy current conductor and squirrel cage are all applied at one point per coil in this arrangement.

Since the number of squirrel cage bars is reduced their effect should be increased in like proportion. Thus, it becomes desirable to force more flux per bar beneath the squirrel cage and consequently the slits 12 are somewhat wider than in my former patent. This adds to the advantage of the present arrangement because of the greater facility with which these wider slits may be punched. Since all coils are equally linked with the squirrel cage by reason of the arrangement described in connection with Fig. 1, the reactance of all coils is equal and the winding is electrically balanced.

I do not confine myself to this particular winding arrangement and relation between the number of commutated winding and squirrel cage slots represented in Fig. 1 since it might be desirable, in certain cases, to still further reduce the number of squirrel cage slots in proportion to the number of commutated winding slots.

In Fig. 2 I have represented a rotor lamination in which the dimensions are proportioned to obtain the results contemplated by this invention, when a cast aluminum squirrel cage rotor is employed. I have found that the characteristics of a motor built in accordance with this invention are substantially similar to those obtained in a motor built in accordance with the teachings of my Patent No. 1,537,737.

In accordance with the provisions of the patent statutes, I have described the principle of operation of my invention, together with the apparatus which I now consider to represent the best embodiment thereof; but I desire to have it understood that the apparatus shown and described is only illustrative, and that the invention may be carried out by other means.

What I claim as new and desire to secure by Letters Patent of the United States, is:—

1. An alternating current motor comprising a primary stator member and a secondary rotor member, said rotor member being provided with a commutated winding located in peripheral slots and with a squirrel cage winding located in a lesser number of slots beneath the commutated winding, all series circuits of said commutated winding being equally inductively linked with the squirrel cage winding.

2. A secondary member for an alternating current motor comprising a laminated core member provided with a commutated coil wound winding and a squirrel cage winding, said windings being located in an unequal number of slots in said core member and with all coils of said commutated winding equally inductively linked with the squirrel cage winding.

3. A secondary member for an alternating current motor comprising a laminated core member provided with a coil wound commutated winding located in peripheral slots, and a squirrel cage winding having half as many bars as there are slots for the commutated winding located in slots beneath alternate commutated winding slots, all coils of said commutated winding having their coil sides laid in pairs of slots one of which is above a squirrel cage bar and the other of which is above a solid portion of the laminated core member.

4. A secondary member for an alternating current motor comprising a laminated core member having a commutated coil wound winding and a squirrel cage winding, the number of squirrel cage bars being equal to one-half the number of coils in the commutated winding, said coils being located in uniformly distributed slots at different depths in said core member with all coils equally inductively linked with the squirrel cage winding.

5. A laminated rotor for an alternating current dynamo electric machine having a repulsion motor coil wound winding and a permanently short-circuited winding, the short-circuited winding being located in a lesser number of slots than said repulsion motor winding, a flux path between said windings of sufficient capacity to permit the normal operating flux of the machine to thread the same without excessive saturation and of such reluctance as to cause a portion of said flux to pass beneath said windings, all coils of said repulsion motor winding being equally inductively linked with said permanently short-circuited winding.

6. A laminated rotor for an alternating current dynamo electric machine having a coil wound commutated winding in peripheral slots and a squirrel cage winding in a lesser number of slots situated beneath a portion only of said commutated winding slots, the squirrel cage slots being connected to said portion of the commutated winding slots by narrow air gaps provided in the rotor laminations, said windings being separated a sufficient distance to permit the normal operating flux to pass between them without excessive saturation, and said air gaps being provided to cause a portion of said flux to pass beneath the squirrel cage winding, all coils of said commutated winding being equally inductively linked with the squirrel cage winding.

7. A laminated rotor for an alternating current dynamo electric machine having a coil wound commutated winding located in peripheral slots, a squirrel cage winding having a number of bars equal to one-half the number of commutated winding slots and located in slots beneath alternate commutated winding slots, said windings being separated by a magnetic bridge formed by the rotor laminations of sufficient depth to carry the normal operating flux of the machine without excessive saturation, narrow air gaps connecting the squirrel cage winding slots with adjacent alternate peripheral slots so that a portion of said flux will pass beneath the squirel cage winding, the coils of the commutated winding being laid in slots spaced apart a uniform distance so that one side only of each coil is in a slot directly above a squirrel cage bar.

8. A member for a dynamo electric machine comprising a slotted magnetic core, a commutated winding uniformly distributed in the slots, a number of eddy current conductors located adjacent a portion only of said slots for improving commutation, all the series connected circuits of said commutated winding being equally inductively linked with said eddy current conductors.

9. A rotor for dynamo electric machines comprising a slotted magnetic core, a commutated winding uniformly distributed in said slots, narrow air gaps provided in the laminations beneath a portion only of said slots, eddy current conductors in said air gaps for improving commutation, all commutated circuits of said commutated winding being equally inductively linked with said eddy current conductors.

10. A rotor for an alternating current motor comprising a slotted magnetic core, a commutated winding uniformly distributed in said slots, a squirrel cage winding located in a lesser number of slots beneath said commutated winding, eddy current conductors connecting the squirrel cage slots and a portion only of the commutated winding slots for improving commutation, all of the commutated circuits of said commutated winding being equally inductively linked with the eddy current conductors and with the squirrel cage winding.

11. A laminated rotor for an alternating current dynamo electric machine having a commutated winding located in uniformly distributed peripheral slots, evenly distributed slots located beneath only a portion of said peripheral slots, a squirrel cage winding having its bars located in said second mentioned slots, narrow air gaps provided in the rotor laminations between the squirrel cage slots and the peripheral slots beneath which such squirrel cage slots are located, eddy current conductors in said air gaps, said commutated winding being wound to have all of its series connected circuits equally inductively linked with said eddy current conductors.

12. A rotor for an alternating current motor comprising a slotted magnetic core, a commutated winding uniformly distributed in peripheral slots, a squirrel cage winding having bars located in slots beneath every other commutated winding slot, said windings being separated a sufficient distance to permit the normal operating flux of the rotor to pass between said windings without excessive saturation, narrow air gaps connecting the squirrel cage winding slots with the adjacent alternate commutated winding slots to cause a portion of the rotor flux to pass beneath the squirrel cage winding, eddy current conductors in said air gaps for improving commutation, all commutated circuits of said commutated winding being equally inductively linked with said eddy current conductors and with said squirrel cage winding.

In witness whereof, I have hereunto set my hand this 19th day of December, 1927.

SVEN R. BERGMAN.